US012584813B2

(12) United States Patent
Takei

(10) Patent No.: US 12,584,813 B2
(45) Date of Patent: Mar. 24, 2026

(54) GAS LEAK DETECTION DEVICE, GAS LEAK DETECTION SYSTEM, AND GAS LEAK DETECTION METHOD

(71) Applicant: NEC Corporation, Tokyo (JP)

(72) Inventor: Daisuke Takei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 329 days.

(21) Appl. No.: 18/272,703

(22) PCT Filed: Jan. 22, 2021

(86) PCT No.: PCT/JP2021/002223
§ 371 (c)(1),
(2) Date: Jul. 17, 2023

(87) PCT Pub. No.: WO2022/157922
PCT Pub. Date: Jul. 28, 2022

(65) Prior Publication Data
US 2024/0302241 A1 Sep. 12, 2024

(51) Int. Cl.
*G01M 3/04* (2006.01)
(52) U.S. Cl.
CPC ...................................... *G01M 3/04* (2013.01)
(58) Field of Classification Search
CPC .................................. G01M 3/04; G01M 3/38
See application file for complete search history.

(56) References Cited

FOREIGN PATENT DOCUMENTS

| JP | 2002-296142 A | 10/2002 |
| JP | 2013-113806 A | 6/2013 |
| JP | 2013-190228 A | 9/2013 |
| JP | 2016-114500 A | 6/2016 |

OTHER PUBLICATIONS

English Machine Translation of Wada et al., JP 2013-190228A (Year: 2013).*
International Search Report for PCT Application No. PCT/JP2021/002223, mailed on Mar. 16, 2021.
English translation of Written opinion for PCT Application No. PCT/JP2021/002223, mailed on Mar. 16, 2021.

* cited by examiner

*Primary Examiner* — David Z Huang
(74) *Attorney, Agent, or Firm* — Sughrue Mion, PLLC

(57) ABSTRACT

The purpose of the present invention is to provide a gas leak detection device and the like which are capable of detecting a gas leak from a pipe via a simple configuration. A gas leak detection device (2) comprises: a wind direction/wind speed detection means (21) that generates wind direction/wind speed information expressing the distribution of the wind directions and the wind speeds at the periphery of a pipe by means of LiDAR; an air flow detection means (22) that generates information about the air flow at the periphery of the pipe using the wind direction/wind speed information; and a gas leak detection means (24) that detects a gas leak or a vapor leak from the pipe using the information about the air flow.

15 Claims, 14 Drawing Sheets

Fig.8B

GAS LEAK DETECTION DEVICE, GAS LEAK DETECTION SYSTEM, AND GAS LEAK DETECTION METHOD

This application is a National Stage Entry of PCT/JP2021/002223 filed on Jan. 22, 2021, the contents of all of which are incorporated herein by reference, in their entirety.

TECHNICAL FIELD

The present disclosure relates to a gas leak detection device and the like.

BACKGROUND ART

In a facility such as a factory or a power plant, a pipe for gas or vapor (hereinafter, collectively referred to as "gas" in some cases) is provided. There is a case where corrosion or the like of a pipe causes occurrence of a hole in the pipe. Thereby, a gas leak or a vapor leak (hereinafter, collectively referred to as "gas leak" in some cases) occurs. PTL 1 discloses a technique for detecting occurrence of a gas leak.

Specifically, a leak detection device described in PTL 1 includes a laser screen forming unit, an image capturing unit, and a leak determiner. The laser screen forming unit forms a laser screen at a position in the vicinity of a pipe. The image capturing unit captures an image of the formed laser screen. In the captured image, movement of a tracer (e.g., dust) at a position in the vicinity of the pipe is visualized. Based on the movement of the tracer, the leak determiner detects turbulence of a gas flow at a position in the vicinity of the pipe. Thereby, occurrence of a gas leak is detected (refer to paragraphs [0024] to [0027], FIG. 1, and the like in PTL 1).

As a related technique, there is also known a technique described in PTL 2.

CITATION LIST

Patent Literature

PTL 1: Japanese Unexamined Patent Application Publication No. 2002-296142
PTL 2: Japanese Unexamined Patent Application Publication No. 2013-113806

SUMMARY OF INVENTION

Technical Problem

In the technique described in PTL 1, a device (i.e., the laser screen forming unit) that forms a laser screen and a device (i.e., the image capturing unit) that captures an image of the laser screen are used in detecting occurrence of a gas leak. In other words, a plurality of types of devices (i.e., the laser screen forming unit and the image capturing unit) are used. Further, work of installing each of a plurality of types of the devices at an appropriate position is required.

Thus, the technique described in PTL 1 has a problem that a configuration for detecting a gas leak is complicated.

The present disclosure has been made in order to solve the problem as described above, and an object thereof is to provide a gas leak detection device and the like that are able to detect a gas leak of a pipe, with a simple configuration.

Solution to Problem

One aspect of a gas leak detection device according to the present disclosure includes: a wind direction and wind speed detection means for generating, by a LiDAR, wind direction and wind speed information indicating a distribution of a wind direction and a wind speed around a pipe; a gas flow detection means for generating information concerning a gas flow around the pipe by using the wind direction and wind speed information; and a gas leak detection means for detecting a gas leak or a vapor leak of the pipe by using the information concerning the gas flow.

One aspect of a gas leak detection system according to the present disclosure includes: a wind direction and wind speed detection means for generating, by a LiDAR, wind direction and wind speed information indicating a distribution of a wind direction and a wind speed around a pipe; a gas flow detection means for generating information concerning a gas flow around the pipe by using the wind direction and wind speed information; and a gas leak detection means for detecting a gas leak or a vapor leak of the pipe by using the information concerning the gas flow.

One aspect of a gas leak detection method according to the present disclosure includes: generating, by a wind direction and wind speed detection means, by a LiDAR, wind direction and wind speed information indicating a distribution of a wind direction and a wind speed around a pipe; generating, by a gas flow detection means, information concerning a gas flow around the pipe by using the wind direction and wind speed information; and detecting, by a gas leak detection means, a gas leak or a vapor leak of the pipe by using the information concerning the gas flow.

Advantageous Effects of Invention

According to the present disclosure, a gas leak of a pipe can be detected with a simple configuration.

BRIEF DESCRIPTION OF DRAWINGS

FIG. 8B is a description diagram illustrating the example of the state in which the gas leak occurs.

EXAMPLE EMBODIMENT

Hereinafter, an example embodiment of the present disclosure will be described in detail with reference to the accompanying drawings.

First Example Embodiment

Figure 1:
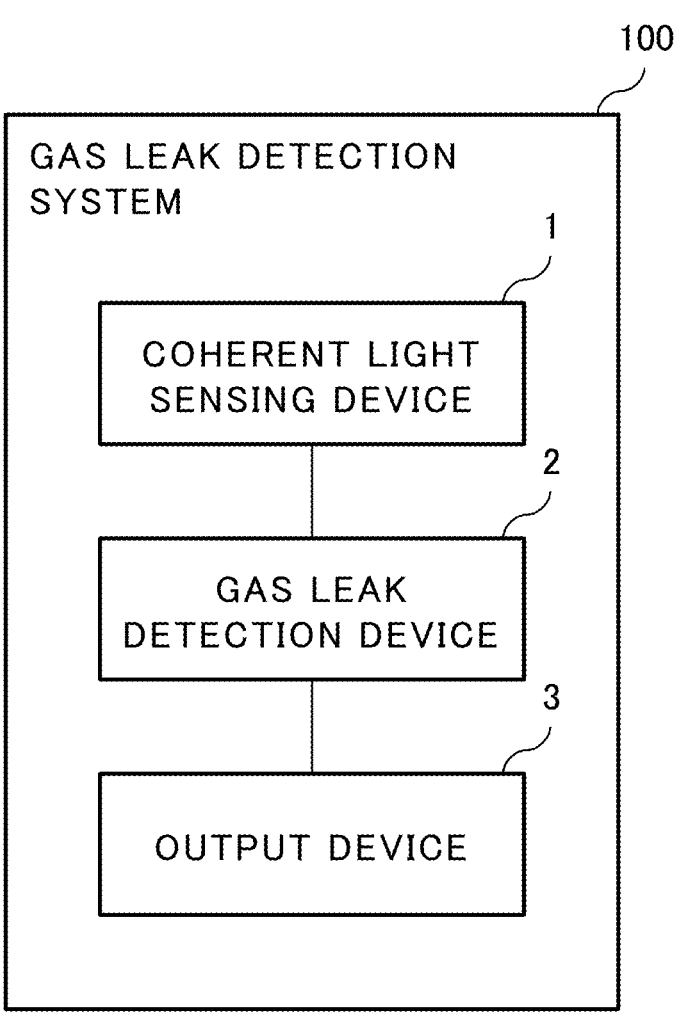
FIG. 1 is a block diagram illustrating a main part of a gas leak detection system according to a first example embodiment.
Figure 2:
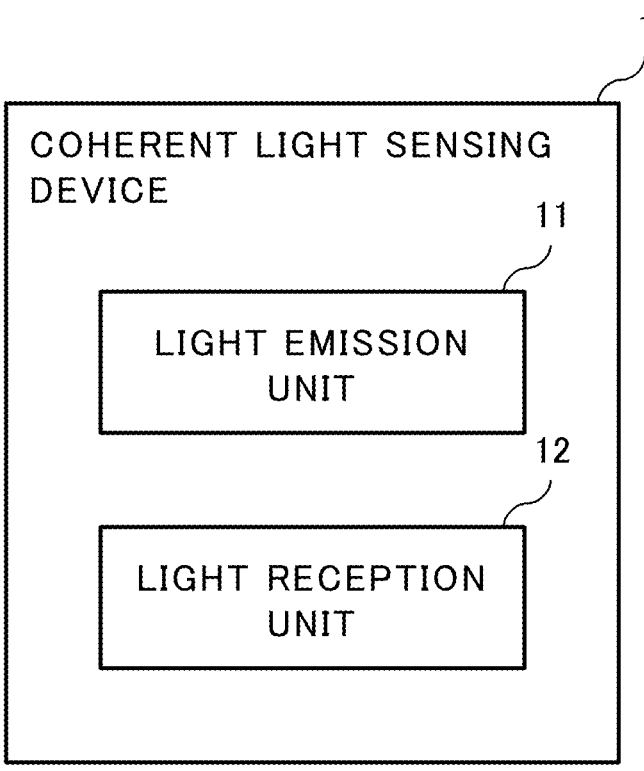
FIG. 2 is a block diagram illustrating a main part of a coherent light sensing device in the gas leak detection system according to the first example embodiment.
Figure 3:
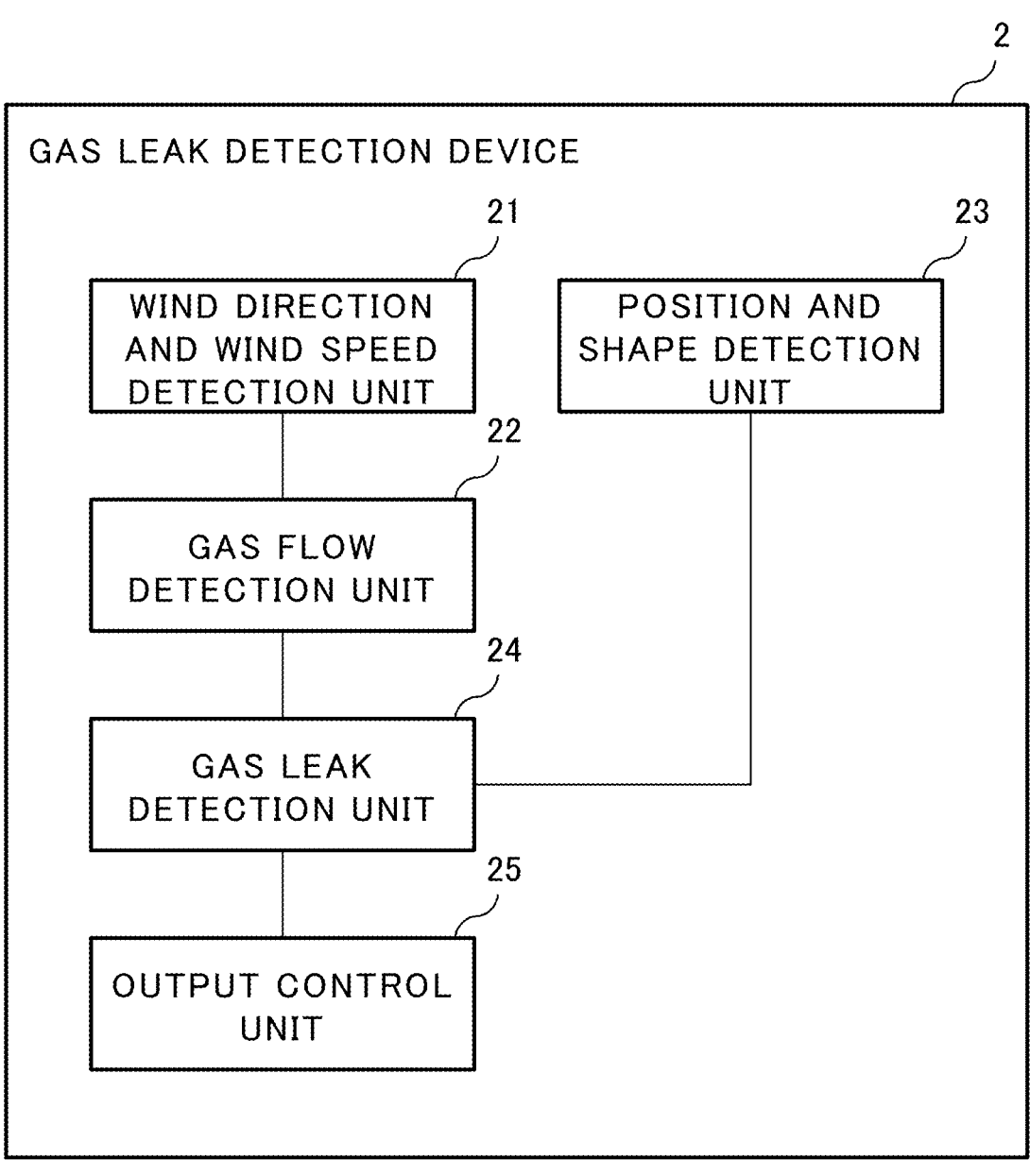
FIG. 3 is a block diagram illustrating a main part of a gas leak detection device according to the first example embodiment.

FIG. 1 is a block diagram illustrating a main part of a gas leak detection system according to a first example embodiment. FIG. 2 is a block diagram illustrating a main part of a coherent light sensing device in the gas leak detection system according to the first example embodiment. FIG. 3 is a block diagram illustrating a main part of a gas leak detection device according to the first example embodiment. The gas leak detection system according to the first example embodiment will be described with reference to FIGS. 1 to 3.

As illustrated in FIG. 1, a gas leak detection system 100 includes a coherent light sensing device 1, a gas leak detection device 2, and an output device 3. As illustrated in FIG. 2, the coherent light sensing device 1 includes a light emission unit 11 and a light reception unit 12. As illustrated in FIG. 3, the gas leak detection device 2 includes a wind direction and wind speed detection unit 21, a gas flow detection unit 22, a position and shape detection unit 23, a gas leak detection unit 24, and an output control unit 25.

The coherent light sensing device 1 is installed in a facility (e.g., a factory or a power plant) including an unillustrated pipe P. Gas or vapor (i.e., gas) flows inside the pipe P. The coherent light sensing device 1 is installed outside the pipe P in such a way as to face the pipe P.

The light emission unit 11 is one that uses a laser light source, for example. The light emission unit 11 emits pulsed laser light. Herein, in the coherent light sensing device 1, a direction in which laser light is emitted by the light emission unit 11 is variable. The light emission unit 11 emits laser light sequentially in a plurality of directions. Thereby, an area (hereinafter, referred to as "irradiation area" in some cases) including the pipe P is irradiated with laser light in such a way as to be scanned.

The irradiated laser light is reflected by a fine particle (hereinafter, referred to as an "aerosol particle") floating in the air within the irradiation area. An example of the aerosol particle includes dust, for example. Hereinafter, laser light reflected by the aerosol particle is referred to as "first reflected light" in some cases. The irradiated laser light is reflected also by an object (including the pipe P) within the irradiation area. Hereinafter, laser light reflected by the object including the pipe P is referred to as "second reflected light" in some cases.

Hereinafter, the first reflected light and the second reflected light are collectively referred to as "reflected light" in some cases. The light reception unit 12 receives the reflected light. The light reception unit 12 is one that uses a light reception element, for example.

Based on laser light emitted by the light emission unit 11 and second reflected light received by the light reception unit 12, the wind direction and wind speed detection unit 21 generates information (hereinafter, referred to as "wind direction and wind speed information") indicating a distribution of a wind direction and a wind speed around the pipe P. A principle of a Doppler LiDAR is used in generating the wind direction and wind speed information. Herein, a LiDAR ("light detection and ranging" or "laser imaging detection and ranging") is one of remote sensing techniques using light. According to the LiDAR technique, scattered light resulting from a pulsed emission of laser irradiation can be measured, and a distance to a distant target and a property of the target can be analyzed. The LiDAR is similar to a radar, and replaces a radio wave of the radar with light.

In other words, the wind direction and wind speed detection unit 21 acquires, from the coherent light sensing device 1, information indicating a frequency component included in laser light emitted by the light emission unit 11. Further, the wind direction and wind speed detection unit 21 acquires, from the coherent light sensing device 1, information indicating a frequency component included in first reflected light associated to the laser light emitted in each direction. The wind direction and wind speed detection unit 21 uses these pieces of information, and thereby calculates a Doppler shift amount in the first reflected light associated to the laser light emitted in each direction. The calculated Doppler shift amount is an amount in relation to reference being a frequency of the laser light emitted by the light emission unit 11. In other words, the calculated Doppler shift amount is based on a difference between the frequency component included in the laser light emitted in each direction and the frequency component included in the associated first reflected light.

The wind direction and wind speed detection unit 21 uses the calculated Doppler shift amount, and thereby calculates a value (hereinafter, referred to as a "wind direction value") indicating a wind direction in each predetermined range in a part, concerning the part associated with a space in the irradiation area. Further, the wind direction and wind speed detection unit 21 calculates a value (hereinafter, referred to as a "wind speed value") indicating a wind speed in each predetermined range in the part.

Specifically, for example, the wind direction and wind speed detection unit 21 uses the calculated Doppler shift amount, and thereby calculates a Doppler speed for each sight line, concerning what is called a "sight line". The wind direction and wind speed detection unit 21 uses the calculated Doppler speed, and thereby calculates a wind vector v in each predetermined range. For example, a velocity azimuth display (VAD) method is used in calculating the wind vector v. A direction of the calculated wind vector v is associated to the wind direction value. Further, magnitude of the calculated wind vector v is associated to the wind speed value.

Herein, as described above, the laser light is irradiated by the light emission unit 11 in such a way as to scan the irradiation area. In this regard, the wind direction and wind speed detection unit 21 may use a principle of a three-dimensional scanning Doppler LiDAR. Alternatively, scanning from three mutually different directions (e.g., three mutually orthogonal directions) may be achieved by moving the coherent light sensing device 1, or by installing a plurality of the coherent light sensing devices 1. Thereby, a three-dimensional map indicating a distribution (more specifically, a distribution of the wind vector v) of a wind direction value and a wind speed value in a space (including a space around the pipe P) within the irradiation area is generated. Hereinafter, the map is referred to as a "wind direction and wind speed map". The wind direction and wind speed detection unit 21 includes the generated wind direction and wind speed map in the wind direction and wind speed information. In other words, the wind direction and wind speed detection unit 21 generates the wind direction and wind speed information including the generated wind direction and wind speed map.

In addition, various known techniques concerning the Doppler LiDAR can be used in calculating a wind direction value and a wind speed value. Various known techniques concerning the Doppler LiDAR can be used in generating a wind direction and wind speed map. Detailed description of these techniques is omitted.

The gas flow detection unit 22 uses wind direction and wind speed information generated by the wind direction and wind speed detection unit 21, and thereby detects local gas flow turbulence (hereinafter, referred to as a "turbulent gas flow") in the irradiation area. More specifically, the gas flow detection unit 22 detects a singular point in a wind direction and wind speed map included in the generated wind direction and wind speed information. Thereby, the gas flow detection unit 22 detects presence or absence of occurrence of a turbulent gas flow in a space (including a space around the pipe P) within the irradiation area, and also detects an occurrence position of the turbulent gas flow.

Specifically, for example, the gas flow detection unit 22 uses the wind direction and wind speed map, and thereby calculates a divergence ∇·v of the wind vector v in each predetermined range, concerning three predetermined mutually orthogonal directions (including an X direction, a Y direction, and a Z direction). Thereby, a plurality of the divergences ∇·v are calculated. The gas flow detection unit 22 detects, as a singular point, a peak value among a plurality of the calculated divergences ∇·v. The gas flow detection unit 22 detects, as a singular point, a dip value among a plurality of the calculated divergences ∇·v.

When at least one of the peak value and the dip value is detected, the gas flow detection unit 22 determines that a turbulent gas flow has been occurred. Otherwise, the gas flow detection unit 22 determines that no turbulent gas flow has been occurred.

When the peak value is detected, the gas flow detection unit 22 detects an occurrence position of the turbulent gas flow in the irradiation area, based on a position associated to the detected peak value in the wind direction and wind speed map. When the dip value is detected, the gas flow detection unit 22 detects an occurrence position of the turbulent gas flow in the irradiation area, based on a position associated to the detected dip value in the wind direction and wind speed map.

Alternatively, for example, the gas flow detection unit 22 uses wind speed values included in the wind direction and wind speed map, and thereby generates a graph associated to one predetermined direction (e.g., the X direction, the Y direction, or the Z direction). A specific example of the graph will be described later with reference to FIGS. 8A to 8B and FIGS. 9A to 9C. The gas flow detection unit 22 detects, as a singular point, a discontinuous point in the generated graph.

When a discontinuous point is detected, the gas flow detection unit 22 determines that a turbulent gas flow has been occurred. Otherwise, the gas flow detection unit 22 determines that no turbulent gas flow has been occurred.

When a discontinuous point is detected, the gas flow detection unit 22 detects an occurrence position of the turbulent gas flow in the irradiation area, based on a position associated to the detected discontinuous point in the wind direction and wind speed map.

In such a manner, presence or absence of occurrence of a turbulent gas flow is detected, and also an occurrence position of the turbulent gas flow is detected. The gas flow detection unit 22 generates information concerning the detected turbulent gas flow. In other words, the gas flow detection unit 22 generates the information (hereinafter, referred to as "gas flow information" in some cases) concerning the gas flow around the pipe P. In other words, the gas flow information includes information indicating presence or absence of occurrent of the turbulent gas flow. In addition to this, the gas flow information may include information indicating the occurrence position of the turbulent gas flow.

The position and shape detection unit 23 generates information (hereinafter, referred to as "position and shape information") indicating a position and a shape of the pipe P, based on second reflected light received by the light reception unit 12. A principle of a time of flight (ToF) LiDAR is used in generating the position and shape information.

In other words, the position and shape detection unit 23 acquires, from the coherent light sensing device 1, information indicating time when laser light is emitted in each direction. Further, the position and shape detection unit 23 acquires, from the coherent light sensing device 1, information indicating time when the associated second reflected light is received. The position and shape detection unit 23 uses these pieces of information, and thereby calculates a one-way propagation distance associated to round-trip propagation time, concerning the laser light emitted in each direction and the associated second reflected light.

Based on the calculated one-way propagation distance, the position and shape detection unit 23 calculates a coordinate value indicating a position of a spot where the second reflected light associated to the laser light emitted in each direction is reflected. The coordinate value is a coordinate value in a virtual three-dimensional coordinate space. Points associated with individual coordinate values in the three-dimensional coordinate space are arranged, and a three-dimensional model indicating a surface shape of individual objects within the irradiation area is thereby generated. In other words, the generated three-dimensional model is constituted of a point group.

In addition, various known techniques can be used in generating the three-dimensional model using the ToF LiDAR. Detailed description of these techniques is omitted.

Hereinafter, a part included in the generated three-dimensional model and associated to the pipe P is referred to as a "pipe model". The position and shape detection unit 23 detects a shape of the pipe P, based on a shape of a pipe model PM. The position and shape detection unit 23 detects a position of the pipe P in the irradiation area, based on a position of the pipe model PM in the three-dimensional coordinate space. In such a manner, the position and shape information is generated.

The gas leak detection unit 24 acquires the gas flow information generated by the gas flow detection unit 22 and the position and shape information generated by the position and shape detection unit 23. The gas leak detection unit 24 uses these pieces of information, and thereby detects a gas leak of the pipe P. More specifically, the gas leak detection unit 24 detects presence of absence of occurrence of a gas leak in the pipe P, and also detects a position (hereinafter, referred to as an "occurrence point") LP where the gas leak occurs in the pipe P.

In other words, when a turbulent gas flow is occurred, the gas leak detection unit 24 uses the position and shape information, and thereby determines whether an occurrence position of the turbulent gas flow is in the vicinity of the pipe P. When the occurrence position of the turbulent gas flow is in the vicinity of the pipe P, the gas leak detection unit 24 determines that a gas leak occurs in the pipe P. In this case, the gas leak detection unit 24 determines that the position associated to the occurrence position of the turbulent gas flow on a surface portion of the pipe P is the gas leak occurrence point LP. On the other hand, when no turbulent gas flow is occurred, or when the occurrence position of the turbulent gas flow is a position distant from the pipe P, the gas leak detection unit 24 determines that no gas leak occurs in the pipe P.

In such a manner, presence or absence of occurrence of a gas leak in the pipe P is detected, and the gas leak occurrence point LP in the pipe P is detected. The gas leak detection unit 24 generates information (hereinafter, referred to as "detection result information") indicating a result of the detection. At this time, the gas leak detection unit 24 may include, in the detection result information, the pipe model PM included in the acquired position and shape information.

The output control unit 25 acquires the detection result information generated by the gas leak detection unit 24. The output control unit 25 executes control of outputting the acquired detection result information. The output device 3 is used in outputting the detection result information. The output device 3 includes at least one of a display device, an audio output device, and a communication device, for example. The display device is one that uses a display, for example. The audio output device is one that uses a speaker, for example. The communication device is one that uses a dedicated transmitter and receiver, for example.

For example, the output control unit 25 executes control of displaying an image I including the detection result information. The display device in the output device 3 is used in displaying the image I. Alternatively, for example, the output control unit 25 executes control of outputting audio including the detection result information. The audio device in the output device 3 is used in outputting the audio. Alternatively, for example, the output control unit 25 executes control of transmitting a signal including the detection result information. The communication device in the output device 3 is used in transmitting the signal.

Herein, the image I may include following images I_P and I_LP. In other words, the output control unit 25 uses the pipe model PM included in the detection result information, and thereby generates a three-dimensional image (hereinafter, referred to as a "first image" in some cases) I_P of the pipe P. Further, the output control unit 25 uses the detection result information, and thereby generates an image (hereinafter, referred to as a "second image" in some cases) I_LP indicating the gas leak occurrence point LP. The output control unit 25 generates the image I including these images I_P and I_LP. More specifically, the output control unit 25 generates the image I formed by superimposing the second image I_LP over the first image I_P. A specific example of the image I is described later with reference to FIG. 10.

In such a manner, the main part of the gas leak detection system 100 is configured.

Hereinafter, the light emission unit 11 is referred to as a "light emission means" in some cases. The light reception unit 12 is referred to as a "light reception means" in some cases. The wind direction and wind speed detection unit 21 is referred to as a "wind direction and wind speed detection means" in some cases. The gas flow detection unit 22 is referred to as a "gas flow detection means" in some cases. The position and shape detection unit 23 is referred to as a "position and shape detection means" in some cases. The gas leak detection unit 24 is referred to as a "gas leak detection means" in some cases. The output control unit 25 is referred to as an "output control means" in some cases.

Next, a hardware configuration of the main part of the gas leak detection device 2 will be described with reference to FIGS. 4 to 6.

Figure 4:
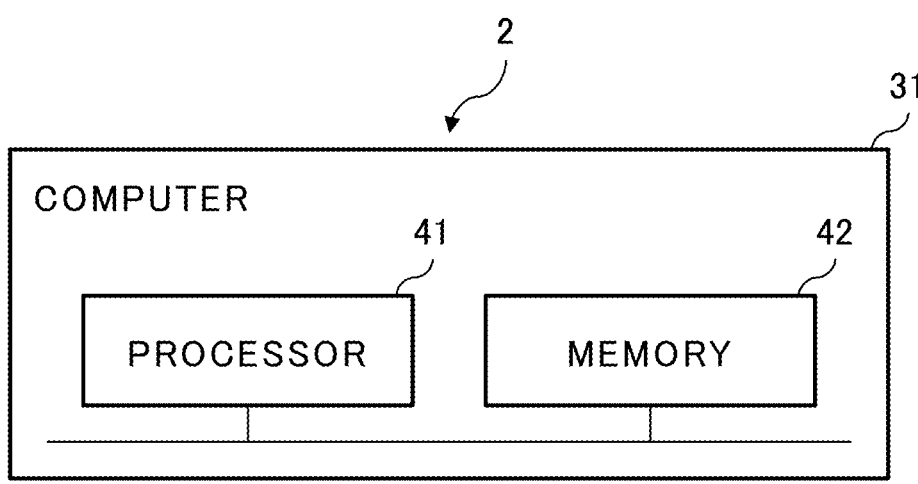
FIG. 4 is a block diagram illustrating a hardware configuration of the main part of the gas leak detection device according to the first example embodiment.
Figure 5:
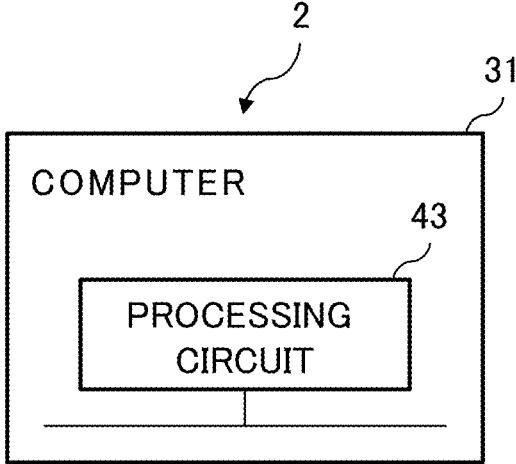
FIG. 5 is a block diagram illustrating another hardware configuration of the main part of the gas leak detection device according to the first example embodiment.
Figure 6:
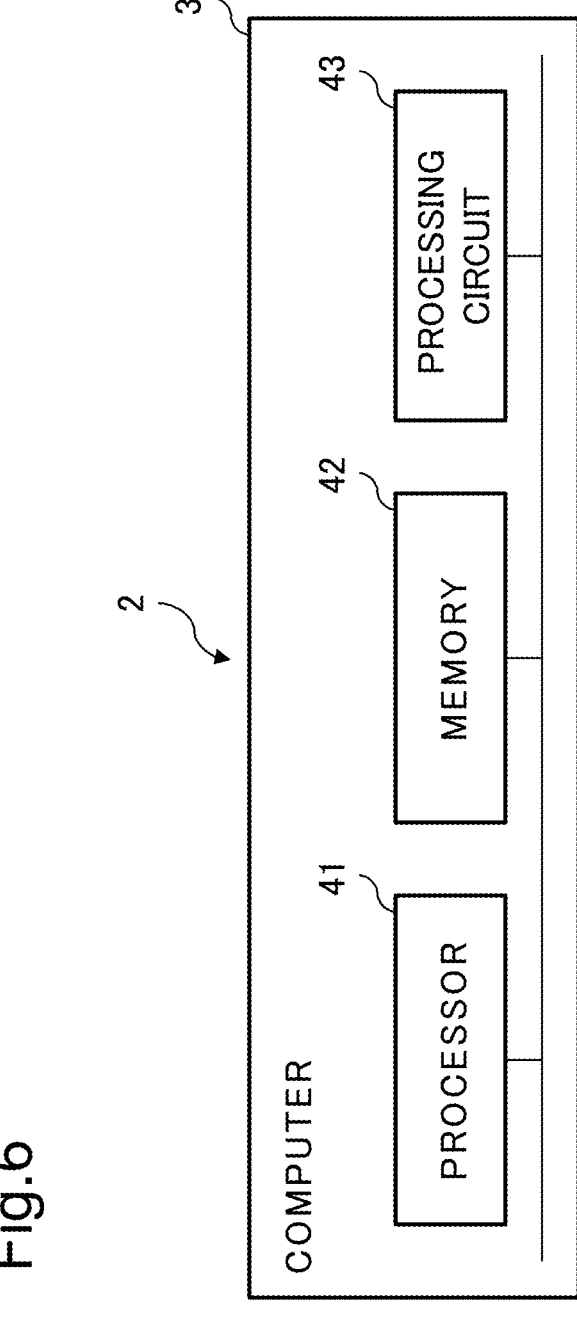
FIG. 6 is a block diagram illustrating another hardware configuration of the main part of the gas leak detection device according to the first example embodiment.

As illustrated in each of FIGS. 4 to 6, the gas leak detection device 2 is one that uses a computer 31. The computer 31 may be provided integrally with the coherent light sensing device 1. Alternatively, the computer 31 may be provided at another place (e.g., within a cloud network). Alternatively, a part of elements of the computer 31 may be provided integrally with the coherent light sensing device 1, and also the remaining elements of the computer 31 may be provided at another place.

As illustrated in FIG. 4, the computer 31 includes a processor 41 and a memory 42. The memory 42 stores a program for causing the computer 31 to function as the wind direction and wind speed detection unit 21, the gas flow detection unit 22, the position and shape detection unit 23, the gas leak detection unit 24, and the output control unit 25. The processor 41 reads out the program stored in the memory 42 and executes the read program. Thereby, a function F1 of the wind direction and wind speed detection unit 21, a function F2 of the gas flow detection unit 22, a function F3 of the position and shape detection unit 23, a function F4 of the gas leak detection unit 24, and a function F5 of the output control unit 25 are achieved.

Alternatively, as illustrated in FIG. 5, the computer 31 includes processing circuitry 43. The processing circuitry 43 executes processing for causing the computer 31 to function as the wind direction and wind speed detection unit 21, the gas flow detection unit 22, the position and shape detection unit 23, the gas leak detection unit 24, and the output control unit 25. Thereby, the functions F1 to F5 are achieved.

Alternatively, as illustrated in FIG. 6, the computer 31 includes the processor 41, the memory 42, and the processing circuitry 43. In this case, a part of the functions F1 to F5 is achieved by the processor 41 and the memory 42, and also the remaining functions of the functions F1 to F5 is achieved by the processing circuitry 43.

The processor 41 is constituted of one or more processors. The individual processors are ones that use a central processing unit (CPU), a graphics processing unit (GPU), a microprocessor, a microcontroller, or a digital signal processor (DSP), for example.

The memory 42 is constituted of one or more memories. The individual memories are ones that use a random access memory (RAM), a read only memory (ROM), a flash memory, an erasable programmable read only memory (EPROM), an electrically erasable programmable read only memory (EEPROM), a solid state drive, a hard disk drive, a flexible disc, a compact disc, a digital versatile disc (DVD), a blue-ray disc, a magneto optical (MO) disc, or a mini disc, for example.

The processing circuitry 43 is constituted of one or more pieces of processing circuitry. The individual pieces of the processing circuitry are circuitry that use an application specific integrated circuit (ASIC), a programmable logic device (PLD), a field programmable gate array (FPGA), a system on a chip (SoC), or system large scale integration (LSI), for example.

The processor 41 may include a dedicated processor associated to each of the functions F1 to F5. The memory 42 may include a dedicated memory associated to each of the functions F1 to F5. The processing circuitry 43 may include a dedicated piece of processing circuitry associated to each of the functions F1 to F5.

Figure 7:
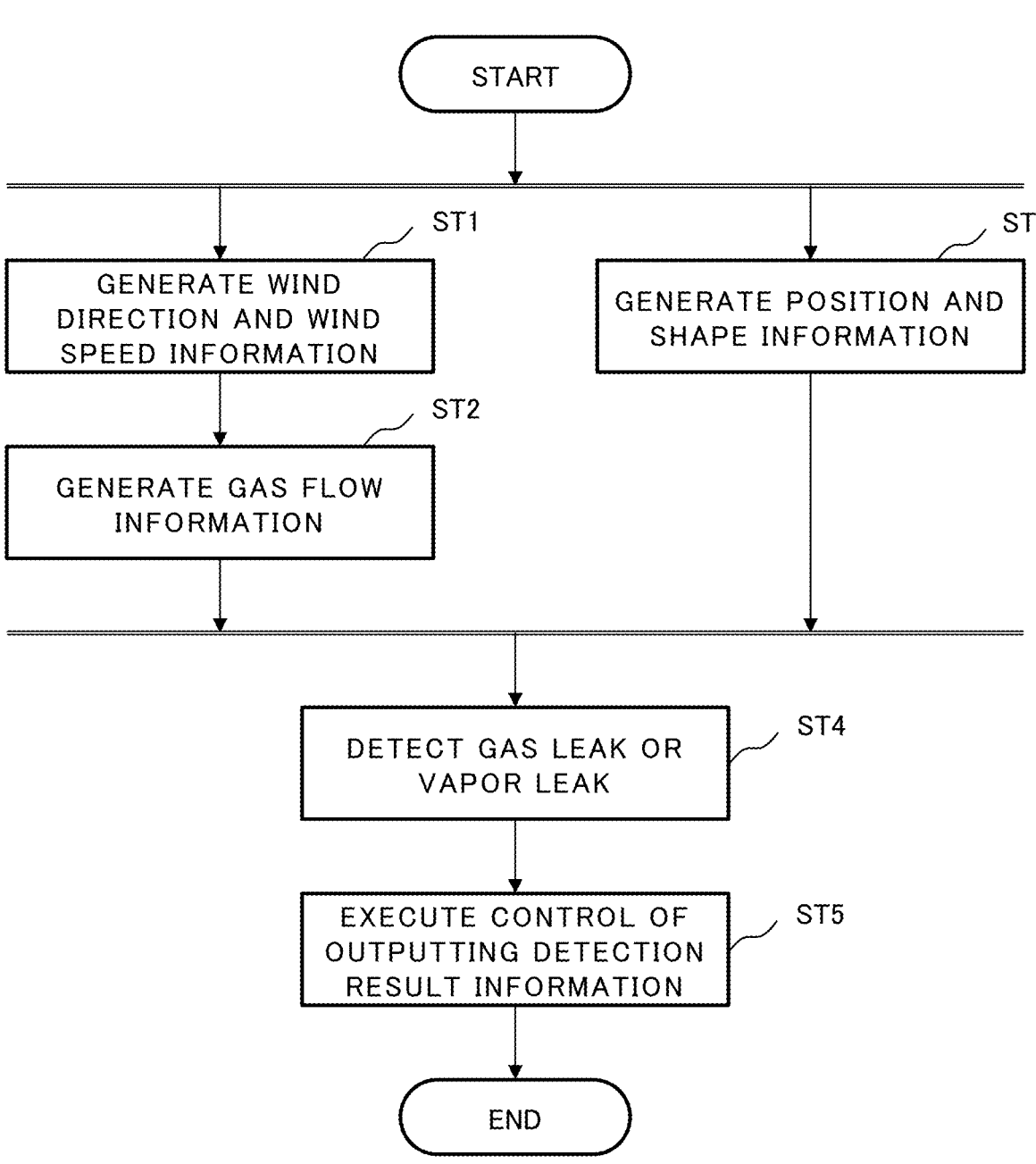
FIG. 7 is a flowchart illustrating operation of the gas leak detection device according to the first example embodiment.

Next, operation of the gas leak detection device 2 will be described with reference to a flowchart illustrated in FIG. 7.

First, the wind direction and wind speed detection unit 21 generates the wind direction and wind speed information (step ST1). Next, the gas flow detection unit 22 generates the gas flow information (step ST2). As described above, the wind direction and wind speed information generated at the step ST1 is used in generating the gas flow information.

The position and shape detection unit 23 generates the position and shape information (step ST3).

Next, the gas leak detection unit 24 detects a gas leak (step ST4). As described above, the gas flow information generated at the step ST2 and the position and shape information generated at the step ST3 are used in detecting the gas leak. Next, the output control unit 25 executes control of outputting information (i.e., the detection result information) indicating a result of the detection at the step ST4 (step ST5).

Figure 8A:
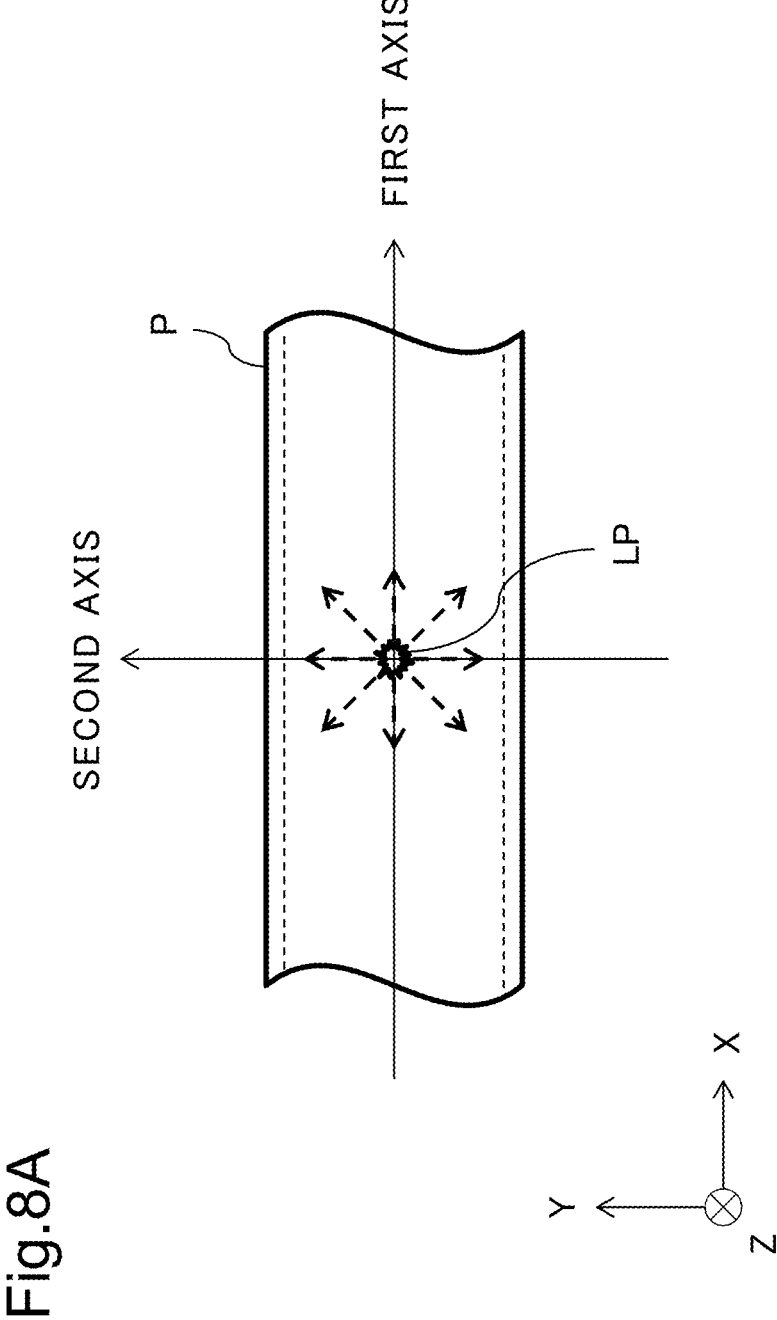
FIG. 8A is a description diagram illustrating an example of a state in which a gas leak occurs.
Figure 8B:
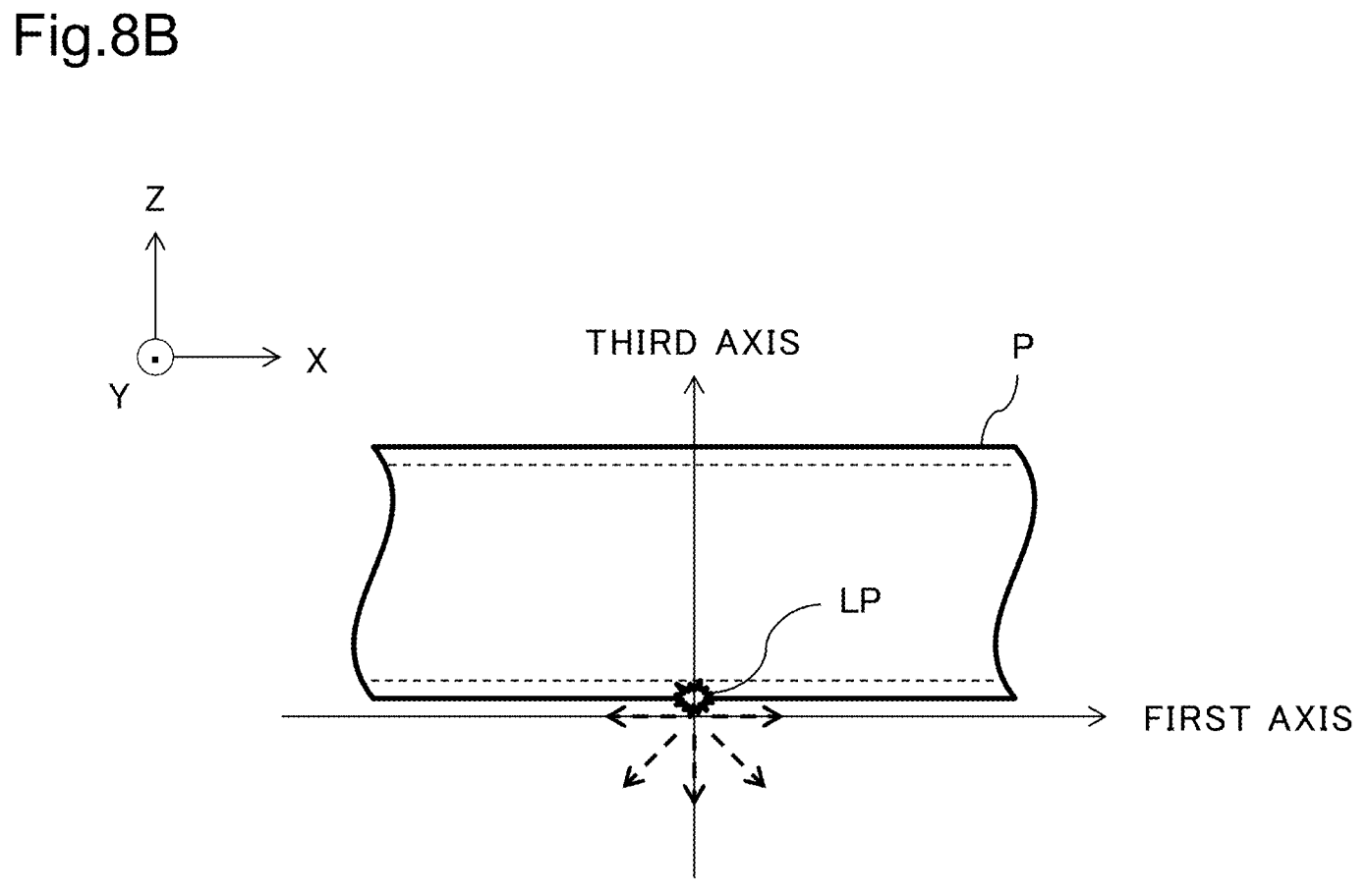

Next, a specific example of a graph used in detecting a turbulent gas flow by the gas flow detection unit 22 will be described with reference to FIGS. 8A to 8B and FIGS. 9A to 9C. In FIGS. 8A and 8B, a specific example of the X direction, the Y direction and the Z direction are illustrated.

As illustrated in FIGS. 8A and 8B, a gas leak of the pipe P occurs. In general, at a gas leak occurrence point LP, gas blowoff or gas suction occurs. In the example illustrated in FIGS. 8A and 8B, gas blowoff occurs. Occurrence of gas blowoff or gas suction causes occurrence of local gas flow turbulence (i.e., a turbulent gas flow).

An arrow of a dashed line in FIG. 8A indicates an example of a gas flow caused by gas blowoff. A direction of the individual arrows indicates a direction of the gas flow, along an XY plane in the drawing. As illustrated in FIG. 8A, in the direction along the XY plane in the drawing, the gas flow spreading radially around a center being the gas leak occurrence point LP is occurred.

An arrow of a dashed line in FIG. 8B indicates an example of a gas flow caused by gas blowoff. A direction of the individual arrows indicates a direction of the gas flow, along an XZ plane in the drawing. As illustrated in FIG. 8B, in the direction along the XZ plane in the drawing, the gas flow spreading semi-radially from a center being the gas leak occurrence point LP is occurred. This similarly applies to a direction along a YZ plane.

Herein, a first axis in FIGS. 8A and 8B indicates a virtual axis as follows. In other words, the first axis is an axis along the X direction (i.e., a direction along a pipe axis of the pipe P) in the drawing. The first axis is an axis that passes through a position in the vicinity of the gas leak occurrence point LP in a space around the pipe P.

A second axis in FIG. 8A indicates a virtual axis as follows. In other words, the second axis is an axis along the Y direction (i.e., a direction orthogonal to the pipe axis of the pipe P) in the drawing. The second axis is an axis that passes through a position in the vicinity of the gas leak occurrence point LP in the space around the pipe P. In FIG. 8B, an illustration of the second axis is omitted.

A third axis in FIG. 8B indicates a virtual axis as follows. In other words, the third axis is an axis along the Z direction (i.e., another direction orthogonal to the pipe axis of the pipe P) in the drawing. The third axis is an axis that passes through the gas leak occurrence point LP. In FIG. 8A, an illustration of the third axis is omitted.

Figure 9A:
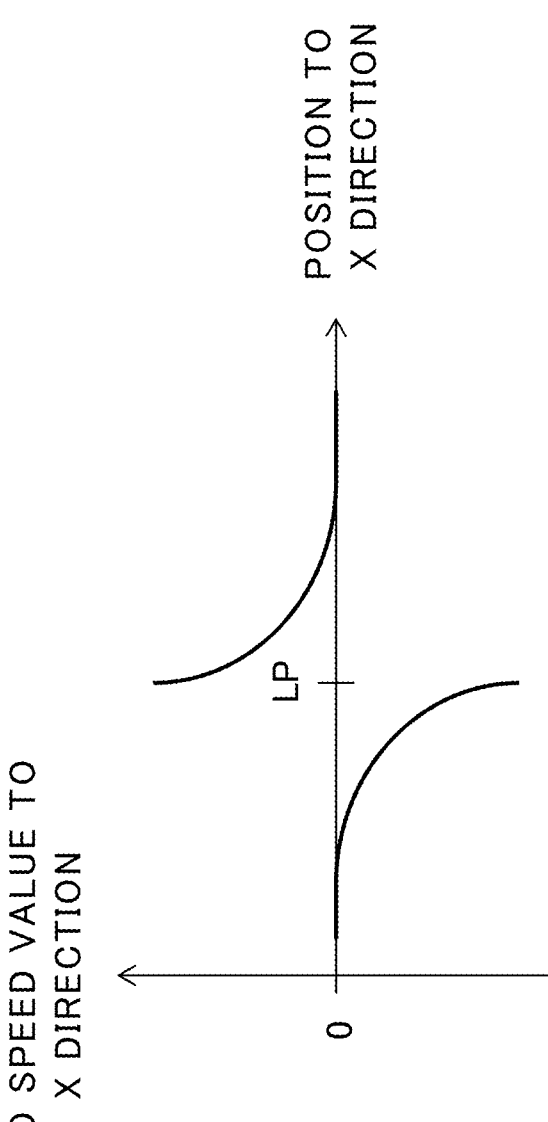
FIG. 9A is a description diagram illustrating an example of a graph associated to a part along a first axis in a wind direction and wind speed map.

The wind direction and wind speed information (more specifically, the wind direction and wind speed map) includes a wind speed value to the X direction at a part along the first axis, in the space around the pipe P. FIG. 9A illustrates an example of a graph indicating the wind speed values. In other words, FIG. 9A illustrates one example of the graph associated to the X direction.

As illustrated in FIG. 9A, on the first axis, an absolute value of the wind speed value gradually increases as a position associated to the gas leak occurrence point LP is approached. On the first axis, a wind direction is reversed at the position. In other words, a positive or a negative of the wind speed value is reversed at the position. Thus, as illustrated in FIG. 9A, a discontinuous point in the graph occurs at the position. In other words, a singular point occurs at the position.

Figure 9B:
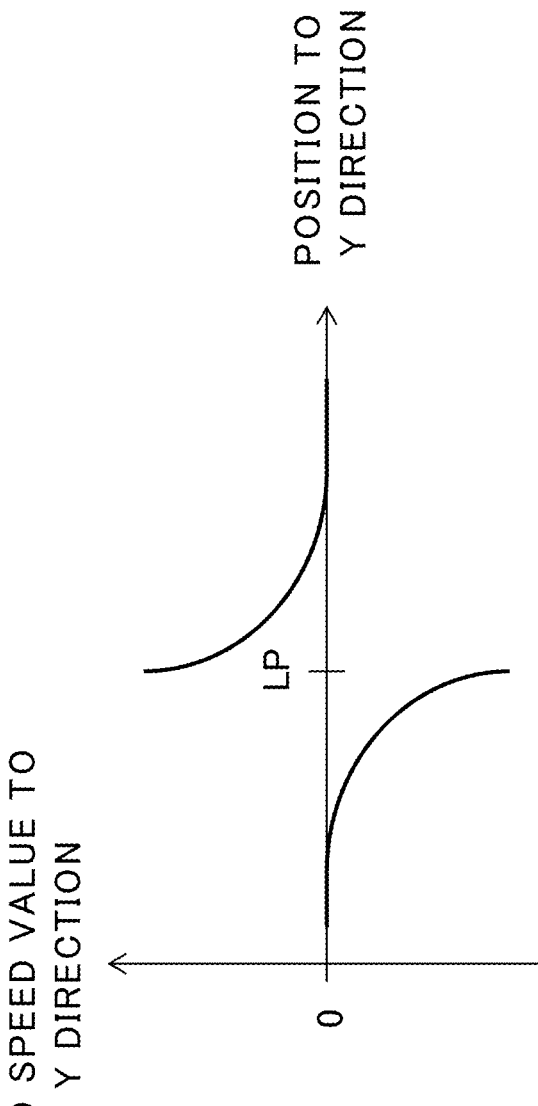
FIG. 9B is a description diagram illustrating an example of a graph associated to a part along a second axis in the wind direction and wind speed map.

Similarly, the wind direction and wind speed information (more specifically, the wind direction and wind speed map) includes a wind speed value to the Y direction at a part along the second axis, in the space around the pipe P. FIG. 9B illustrates an example of a graph indicating the wind speed values. In other words, FIG. 9B illustrates one example of the graph associated to the Y direction.

As illustrated in FIG. 9B, on the second axis, an absolute value of the wind speed value gradually increases as a position associated to the gas leak occurrence point LP is approached. On the second axis, a wind direction is reversed at the position. In other words, a positive or a negative of the wind speed value is reversed at the position. Thus, as illustrated in FIG. 9B, a discontinuous point in the graph occurs at the position. In other words, a singular point occurs at the position.

Figure 9C:
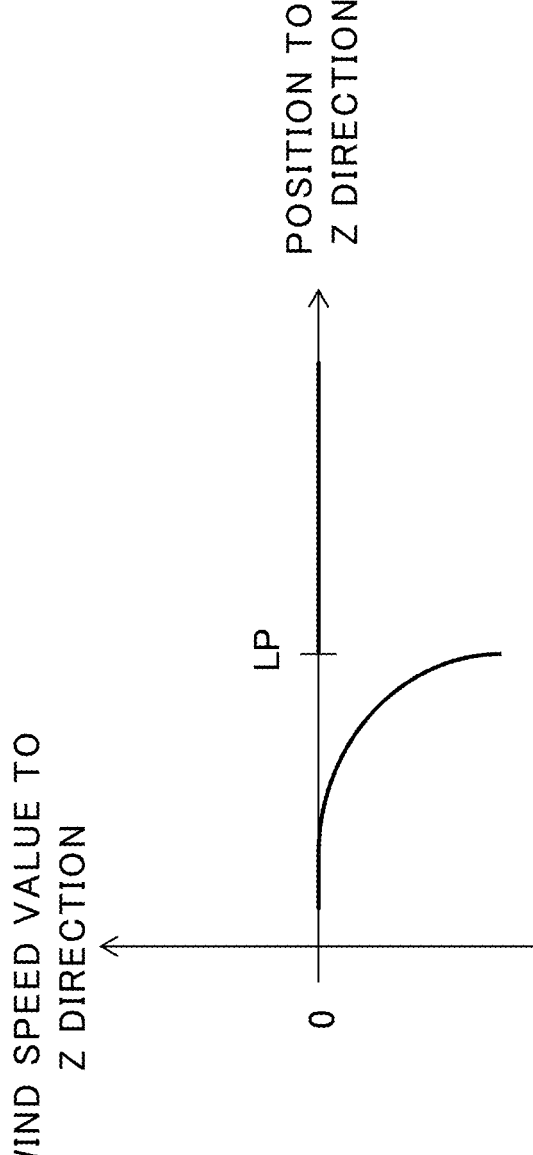
FIG. 9C is a description diagram illustrating an example of a graph associated to a part along a third axis in the wind direction and wind speed map.

Similarly, the wind direction and wind speed information (more specifically, the wind direction and wind speed map) includes a wind speed value to the Z direction at a part along the third axis, in the space around the pipe P. FIG. 9C illustrates an example of a graph indicating the wind speed values. In other words, FIG. 9C illustrates one example of the graph associated to the Z direction.

As illustrated in FIG. 9C, on the third axis, an absolute value of the wind speed value gradually increases in the space around the pipe P as a position associated to the gas leak occurrence point LP is approached. On the other hand, the wind speed value at a position associated to an inside of the pipe P is a zero value (i.e., undetected). Thus, as illustrated in FIG. 9C, a discontinuous point in the graph occurs at the position associated to the gas leak occurrence point LP. In other words, a singular point occurs at the position.

As described above, in the graph associated with each of the X direction, the Y direction, and the Z direction, when the axis associated to the graph passes through the position associated to the gas leak occurrence point LP, a discontinuous point is generated at the position. In this regard, the gas flow detection unit 22 detects an occurrence position of the turbulent gas flow by executing the following processing, for example.

In other words, the gas flow detection unit 22 sets a plurality of virtual axes (hereinafter, referred to as a "first axis group") as follows. In other words, the individual axes included in the first axis group are axes along the X direction, and are axes passing through a position in the vicinity of the pipe P. A plurality of the axes included in the first axis group are arranged one-dimensionally along the Y direction. The first axis group includes the first axis illustrated in FIGS. 8A and 8B.

The gas flow detection unit 22 generates, for each of the axes included in the first axis group, a graph similar to the graph described with reference to FIG. 9A. The gas flow detection unit 22 detects a discontinuous point in the generated graph. Thereby, the occurrence position of the turbulent gas flow is detected.

Alternatively, the gas flow detection unit 22 sets a plurality of virtual axes (hereinafter, referred to as a "second axis group") as follows. In other words, the individual axes included in the second axis group are axes along the Y direction, and are axes passing through a position in the vicinity of the pipe P. A plurality of the axes included in the second axis group are arranged one-dimensionally along the X direction. The second axis group includes the second axis illustrated in FIG. 8A.

The gas flow detection unit 22 generates, for each of the axes included in the second axis group, a graph similar to the graph described with reference to FIG. 9B. The gas flow detection unit 22 detects a discontinuous point in the generated graph. Thereby, the occurrence position of the turbulent gas flow is detected.

Alternatively, the gas flow detection unit 22 sets a plurality of virtual axes (hereinafter, referred to as a "third axis group") as follows. In other words, the individual axes included in the third axis group are axes along the Z direction, and are axes passing through a position associated to the pipe P. A plurality of the axes included in the third axis group are arranged two-dimensionally along the X direction and the Y direction. The third axis group includes the third axis illustrated in FIG. 8B.

The gas flow detection unit 22 generates, for each of the axes included in the third axis group, a graph similar to the graph described with reference to FIG. 9C. The gas flow detection unit 22 detects a discontinuous point in the generated graph. Thereby, the occurrence position of the turbulent gas flow is detected.

When environmental wind is occurred in the space around the pipe P, the graph associated to each direction can have an offset to a vertical axis in the drawing, depending on a direction and strength of the environmental wind. However, even in this case, as described above, when the axis associated to the graph passes through the position associated to the gas leak occurrence point LP, a discontinuous point is occurred at the position. Thus, the gas leak occurrence point LP can be detected.

Figure 10:
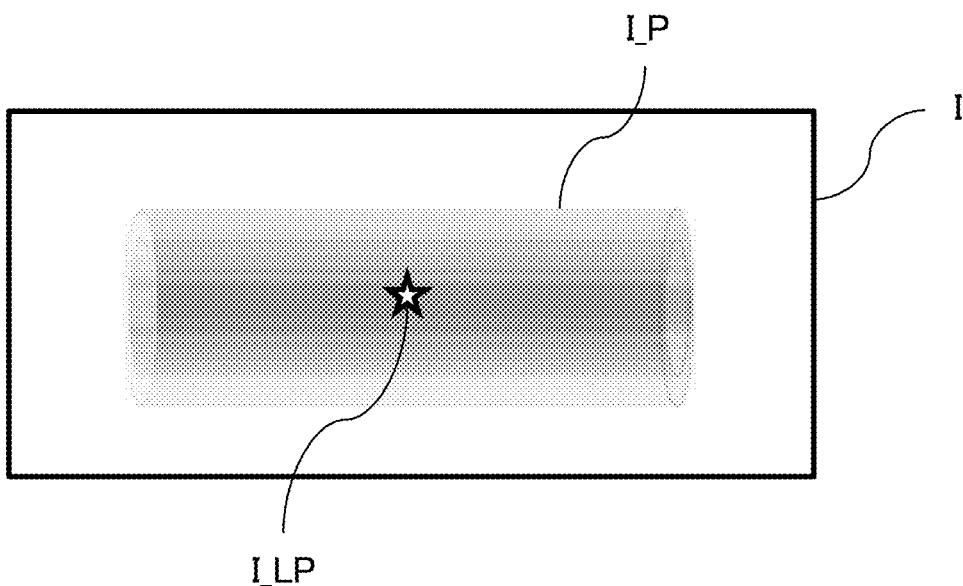
FIG. 10 is a description diagram illustrating an example of an image displayed on a display device.

Next, a specific example of the image I displayed by the display device included in the output device 3 will be described with reference to FIG. 10.

As described above, the image I may include the first image I_P being a three-dimensional image of the pipe P, and the second image I_LP that indicates the gas leak occurrence point LP. In this case, the second image I_LP may be displayed in such a way as to be superimposed over the first image I_P (refer to FIG. 10). A user of the gas leak detection system 100 can visually recognize the gas leak occurrence position LP with ease by viewing the image I.

Next, an advantageous effect achieved by using the gas leak detection system 100 will be described.

As described above, using the gas leak detection system 100 enables a gas leak of the pipe P to be detected. More specifically, presence or absence of occurrence of a gas leak can be detected, and also the gas leak occurrence point LP can be detected. Herein, a gas leak can be detected with a configuration simpler than that in a technique described in PTL 1.

In other words, in the technique described in PTL 1, a device (more specifically, a laser screen forming unit) that forms a laser screen and a device (more specifically, an image capturing unit) that captures an image of the laser screen are used in detecting occurrence of a gas leak. In other words, a plurality of types of devices are used. Further, work of installing each of a plurality of types of the devices at an appropriate position is required.

In contrast to this, the gas leak detection device 2 uses, in detecting occurrence of a gas leak, information (i.e., gas flow information and position and shape information) acquired by using the coherent light sensing device 1. In other words, the gas leak detection device 2 uses information acquired by using one type of the device. Thus, a gas leak can be detected with a configuration simpler than that in the technique described in PTL 1 that uses a plurality of types of the devices.

Next, a modified example of the gas leak detection system 100 will be described.

The wind direction and wind speed map is not limited to a three-dimensional map. The wind direction and wind speed map may be a two-dimensional map. For example, when the gas flow detection unit 22 uses the first axis group or the second axis group, the wind direction and wind speed map may be a two-dimensional map on a virtual plane along the first axis group or the second axis group.

For example, when the position and shape information is generated, a virtual plane along the first axis group or the second axis group is set by using the generated position and shape information. The wind direction and wind speed detection unit 21 generates a map indicating a distribution of a wind direction value and a wind speed value on the set virtual plane. In such a manner, a two-dimensional wind direction and wind speed map is generated.

Next, another modified example of the gas leak detection system 100 will be described.

The light emission unit 11 and the light reception unit 12 may be provided in the gas leak detection device 2 instead of being provided in the coherent light sensing device 1. In other words, the gas leak detection device 2 may include the light emission unit 11 and the light reception unit 12.

Next, another modified example of the gas leak detection system 100 will be described with reference to FIG. 11.

Figure 11:
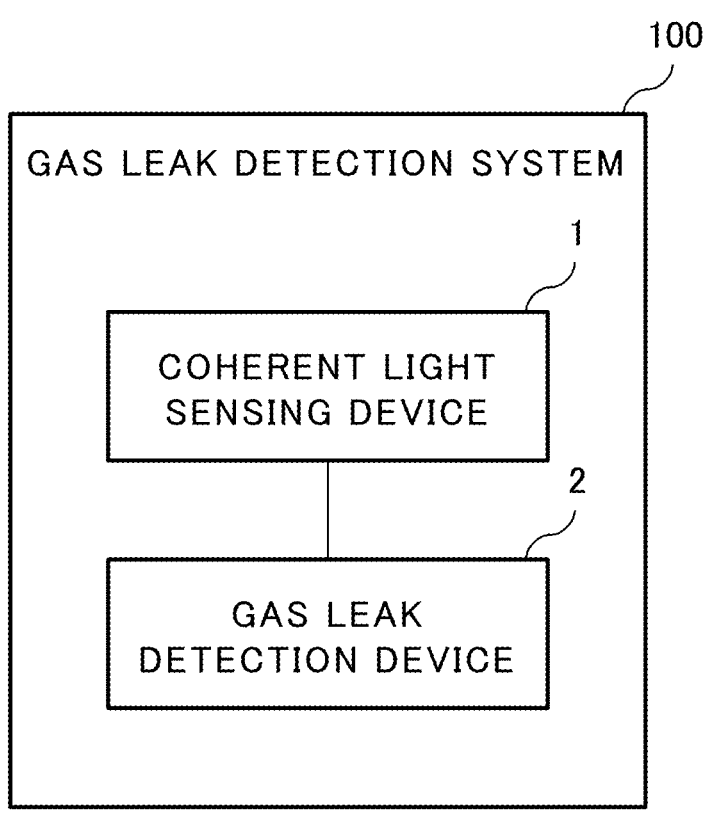
FIG. 11 is a block diagram illustrating a main prat of another gas leak detection system according to the first example embodiment.

As illustrated in FIG. 11, the coherent light sensing device 1 and the gas leak detection device 2 may constitute a main part of the gas leak detection system 100. In other words, the gas leak detection system 100 may be one that does not include the output device 3. In this case, the output device 3 may be provided outside the gas leak detection system 100.

Next, a modified example of the gas leak detection device 2 will be described with reference to FIG. 12.

Figure 12:
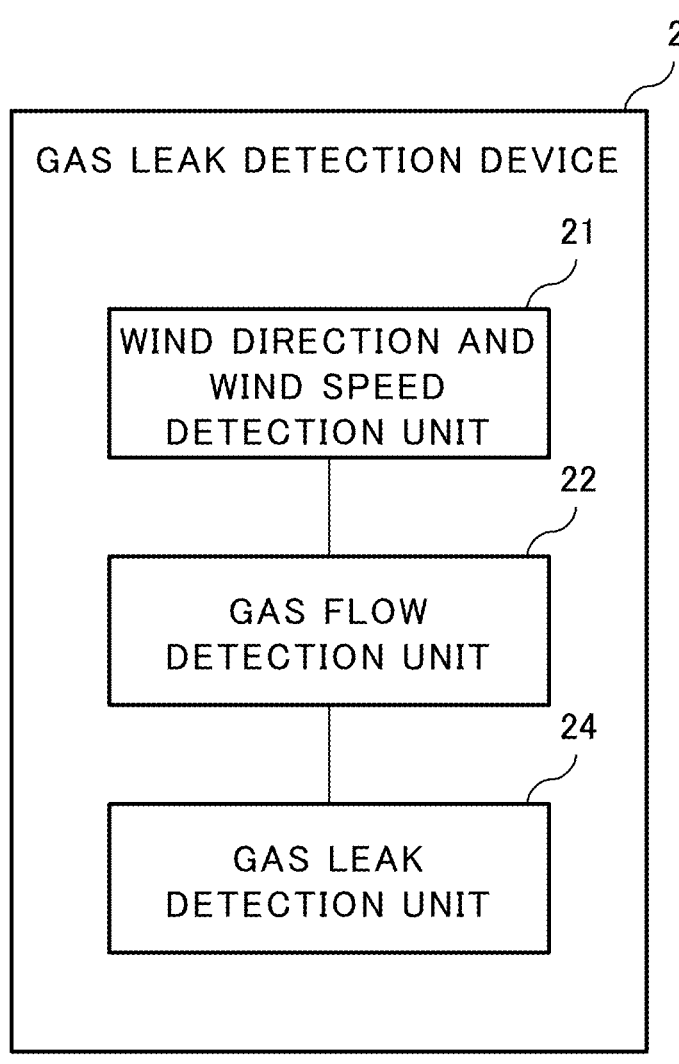
FIG. 12 is a block diagram illustrating a main prat of another gas leak detection device according to the first example embodiment.

As illustrated in FIG. 12, a main part of the gas leak detection device 2 may be constituted of the wind direction and wind speed detection unit 21, the gas flow detection unit 22, and the gas leak detection unit 24. In this case, the output control unit 25 may be provided in the output device 3.

Further, in this case, the gas leak detection unit 24 may detect presence or absence of occurrence of a gas leak by using the gas flow information. In other words, the gas leak detection unit 24 may be one that does not detect the gas leak occurrence point LP. In other words, when the gas flow information indicates that a turbulent gas flow has been occurred, the gas leak detection unit 24 determines that a gas leak has occurred. On the other hand, when the gas flow information indicates that no turbulent gas flow has been occurred, the gas leak detection unit 24 determines that no gas leak has occurred.

Even in the modified example, the advantageous effect as described above can be achieved. In other words, the wind direction and wind speed detection unit 21 generates the wind direction and wind speed information indicating a distribution of a wind direction and a wind speed around the pipe P, based on laser light irradiated to an area (irradiation area) including the pipe P, and first reflected light being reflected light of the laser light caused by an aerosol particle in the area (irradiation area). In other words, the wind direction and wind speed detection unit 21 generates, by using the LiDAR, the wind direction and wind speed information indicating a distribution of a wind direction and a wind speed around the pipe P. The gas flow detection unit 22 generates the information (gas flow information) concerning a gas flow around the pipe P by using the wind direction and wind speed information. The gas leak detection unit 24 detects a gas leak or a vapor leak of the pipe P by using the gas flow information. Thus, a gas leak can be detected by using the information (i.e., the gas flow information) acquired by the LiDAR. In other words, a gas leak can be detected by using the information acquired by using one type of the device (i.e., the coherent light sensing device 1). Thus, a gas leak can be detected with a configuration simpler than that in the technique described in PTL 1.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

A part or all of the above-described example embodiment can be described also as in following supplementary notes, but there is no limitation to the following.

SUPPLEMENTARY NOTES

Supplementary Note 1

A gas leak detection device including:
a wind direction and wind speed detection means for generating, by a LiDAR, wind direction and wind speed information indicating a distribution of a wind direction and a wind speed around a pipe;
a gas flow detection means for generating information concerning a gas flow around the pipe by using the wind direction and wind speed information; and
a gas leak detection means for detecting a gas leak or a vapor leak of the pipe by using the information concerning the gas flow.

Supplementary Note 2

The gas leak detection device according to supplementary note 1, wherein
the wind direction and wind speed detection means generates the wind direction and wind speed information, based on a difference between a frequency component included in laser light irradiated to an area including the pipe and a frequency component included in first reflected light being reflected light of the laser light being caused by an aerosol particle in the area.

Supplementary Note 3

The gas leak detection device according to supplementary note 2, further including
a position and shape detection means for generating position and shape information indicating a position and a shape of the pipe, based on second reflected light including reflected light of the laser light being caused by the pipe.

Supplementary Note 4

The gas leak detection device according to supplementary note 2, wherein
the information concerning the gas flow includes information indicating presence or absence of occurrence of a turbulent gas flow around the pipe, and
the gas leak detection means detects presence or absence of occurrence of the gas leak or the vapor leak by using the information concerning the gas flow.

Supplementary Note 5

The gas leak detection device according to supplementary note 3, wherein
the information concerning the gas flow includes information indicating presence or absence of occurrence of a turbulent gas flow around the pipe, and information indicating an occurrence position of the turbulent gas flow, and
the gas leak detection means detects, by using the information concerning the gas flow and the position and shape information, presence or absence of occurrence of the gas leak or the vapor leak, and an occurrence position of the gas leak or the vapor leak in the pipe.

Supplementary Note 6

The gas leak detection device according to any one of supplementary notes 2 to 5, further including
an output control means for executing control of outputting information indicating a result of detection by the gas leak detection means.

Supplementary Note 7

The gas leak detection device according to supplementary note 6, wherein
the control includes control of displaying an image indicating a result of detection by the gas leak detection means.

Supplementary Note 8

The gas leak detection device according to supplementary note 5, further including
an output control means for executing control of displaying an image indicating a result of detection by the gas leak detection means, wherein
the image includes a first image being a three-dimensional image of the pipe based on the position and shape information, and a second image indicating an occurrence position of the gas leak or the vapor leak.

Supplementary Note 9

The gas leak detection device according to supplementary note 8, wherein the second image is displayed in such a way as to be superimposed over the first image.

Supplementary Note 10

The gas leak detection device according to any one of supplementary notes 2 to 9, further including:
a light emission means for emitting the laser light; and
a light reception means for receiving the first reflected light.

Supplementary Note 11

A gas leak detection system including:
a wind direction and wind speed detection means for generating, by a LiDAR, wind direction and wind speed information indicating a distribution of a wind direction and a wind speed around a pipe;
a gas flow detection means for generating information concerning a gas flow around the pipe by using the wind direction and wind speed information; and
a gas leak detection means for detecting a gas leak or a vapor leak of the pipe by using the information concerning the gas flow.

Supplementary Note 12

The gas leak detection system according to supplementary note 11, wherein
the wind direction and wind speed detection means generates the wind direction and wind speed information, based on a difference between a frequency component included in laser light irradiated to an area including the pipe and a frequency component included in first reflected light being reflected light of the laser light being caused by an aerosol particle in the area.

Supplementary Note 13

The gas leak detection system according to supplementary note 12, further including
a position and shape detection means for generating position and shape information indicating a position and a shape of the pipe, based on second reflected light including reflected light of the laser light being caused by the pipe.

Supplementary Note 14

The gas leak detection system according to supplementary note 12, wherein
the information concerning the gas flow includes information indicating presence or absence of occurrence of a turbulent gas flow around the pipe, and
the gas leak detection means detects presence or absence of occurrence of the gas leak or the vapor leak by using the information concerning the gas flow.

Supplementary Note 15

The gas leak detection system according to supplementary note 13, wherein
the information concerning the gas flow includes information indicating presence or absence of occurrence of a turbulent gas flow around the pipe, and information indicating an occurrence position of the turbulent gas flow, and the gas leak detection means detects, by using the information concerning the gas flow and the position and shape information, presence or absence of occurrence of the gas leak or the vapor leak, and an occurrence position of the gas leak or the vapor leak in the pipe.

Supplementary Note 16

The gas leak detection system according to any one of supplementary notes 12 to 15, further including
an output control means for executing control of outputting information indicating a result of detection by the gas leak detection means.

Supplementary Note 17

The gas leak detection system according to supplementary note 16, wherein
the control includes control of displaying an image indicating a result of detection by the gas leak detection means.

Supplementary Note 18

The gas leak detection system according to supplementary note 15, further including
an output control means for executing control of displaying an image indicating a result of detection by the gas leak detection means, wherein
the image includes a first image being a three-dimensional image of the pipe based on the position and shape information, and a second image indicating an occurrence position of the gas leak or the vapor leak.

Supplementary Note 19

The gas leak detection system according to supplementary note 18, wherein
the second image is displayed in such a way as to be superimposed over the first image.

Supplementary Note 20

The gas leak detection system according to any one of supplementary notes 12 to 19, further including:
a light emission means for emitting the laser light; and
a light reception means for receiving the first reflected light.

Supplementary Note 21

A gas leak detection method including:
generating, by a wind direction and wind speed detection means, by a LIDAR, wind direction and wind speed information indicating a distribution of a wind direction and a wind speed around a pipe;
generating, by a gas flow detection means, information concerning a gas flow around the pipe by using the wind direction and wind speed information; and,
detecting, by a gas leak detection means, a gas leak or a vapor leak of the pipe by using the information concerning the gas flow.

Supplementary Note 22

The gas leak detection method according to supplementary note 21, further including generating, by the wind direction and wind speed detection means, the wind direction and wind speed information, based on a difference between a frequency component included in laser light irradiated to an area including the pipe and a frequency component included in first reflected light being reflected light of the laser light being caused by an aerosol particle in the area.

Supplementary Note 23

The gas leak detection method according to supplementary note 22, further including
generating, by a position and shape detection means, position and shape information indicating a position and a shape of the pipe, based on second reflected light including reflected light of the laser light being caused by the pipe.

Supplementary Note 24

The gas leak detection method according to supplementary note 22, wherein
the information concerning the gas flow includes information indicating presence or absence of occurrence of a turbulent gas flow around the pipe,
the method further includes
detecting, by the gas leak detection means, presence or absence of occurrence of the gas leak or the vapor leak by using the information concerning the gas flow.

Supplementary Note 25

The gas leak detection method according to supplementary note 23, wherein
the information concerning the gas flow includes information indicating presence or absence of occurrence of a turbulent gas flow around the pipe, and information indicating an occurrence position of the turbulent gas flow, and
the method further includes
detecting, by the gas leak detection means, by using the information concerning the gas flow and the position and shape information, presence or absence of occurrence of the gas leak or the vapor leak, and an occurrence position of the gas leak or the vapor leak in the pipe.

Supplementary Note 26

The gas leak detection method according to any one of supplementary notes 22 to 25, further including,
executing, by an output control means, control of outputting information indicating a result of detection by the gas leak detection means.

Supplementary Note 27

The gas leak detection method according to supplementary note 26, wherein
the control includes control of displaying an image indicating a result of detection by the gas leak detection means.

Supplementary Note 28

The gas leak detection method according to supplementary note 25, further including executing, by an output control means, control of displaying an image indicating a result of detection by the gas leak detection means, wherein
the image includes a first image being a three-dimensional image of the pipe based on the position and shape information, and a second image indicating an occurrence position of the gas leak or the vapor leak.

Supplementary Note 29

The gas leak detection method according to supplementary note 28, wherein
the second image is displayed in such a way as to be superimposed over the first image.

Supplementary Note 30

The gas leak detection method according to any one of supplementary notes 22 to 29, further including:
emitting, by a light emission means, the laser light; and
receiving, by a light reception means, the first reflected light.

Supplementary Note 31

A storage medium storing a program for causing a computer to function as:
a wind direction and wind speed detection means for generating, by a LiDAR, wind direction and wind speed information indicating a distribution of a wind direction and a wind speed around a pipe;
a gas flow detection means for generating information concerning a gas flow around the pipe by using the wind direction and wind speed information; and
a gas leak detection means for detecting a gas leak or a vapor leak of the pipe by using the information concerning the gas flow.

Supplementary Note 32

The storage medium according to supplementary note 31, wherein
the wind direction and wind speed detection means generates the wind direction and wind speed information, based on a difference between a frequency component included in laser light irradiated to an area including the pipe and a frequency component included in first reflected light being reflected light of the laser light being caused by an aerosol particle in the area.

Supplementary Note 33

The storage medium according to supplementary note 32, the program causing the computer to further function as
a position and shape detection means for generating position and shape information indicating a position and a shape of the pipe, based on second reflected light including reflected light of the laser light being caused by the pipe.

Supplementary Note 34

The storage medium according to supplementary note 32, wherein
the information concerning the gas flow includes information indicating presence or absence of occurrence of a turbulent gas flow around the pipe, and

the gas leak detection means detects presence or absence of occurrence of the gas leak or the vapor leak by using the information concerning the gas flow.

Supplementary Note 35

The storage medium according to supplementary note 33, wherein the information concerning the gas flow includes information indicating presence or absence of occurrence of a turbulent gas flow around the pipe, and information indicating an occurrence position of the turbulent gas flow, and the gas leak detection means detects, by using the information concerning the gas flow and the position and shape information, presence or absence of occurrence of the gas leak or the vapor leak, and an occurrence position of the gas leak or the vapor leak in the pipe.

Supplementary Note 36

The storage medium according to any one of supplementary notes 32 to 35, the program causing the computer to further function as an output control means for executing control of outputting information indicating a result of detection by the gas leak detection means.

Supplementary Note 37

The storage medium according to supplementary note 36, wherein the control includes control of displaying an image indicating a result of detection by the gas leak detection means.

Supplementary Note 38

The storage medium according to supplementary note 35, the program causing the computer to further function as an output control means for executing control of displaying an image indicating a result of detection by the gas leak detection means, wherein the image includes a first image being a three-dimensional image of the pipe based on the position and shape information, and a second image indicating an occurrence position of the gas leak or the vapor leak.

Supplementary Note 39

The storage medium according to supplementary note 38, wherein the second image is displayed in such a way as to be superimposed over the first image.

REFERENCE SIGNS LIST

1 Coherent light sensing device
2 Gas leak detection device
3 Output device
11 Light emission unit
12 Light reception unit
21 Wind direction and wind speed detection unit
22 Gas flow detection unit
23 Position and shape detection unit
24 Gas leak detection unit
25 Output control unit

20

31 Computer
41 Processor
42 Memory
43 Processing circuitry
100 Gas leak detection system

What is claimed is:

1. A gas leak detection device comprising:
at least one memory configured to store instructions; and
at least one processor configured to execute the instructions to
generate, by LiDAR, wind direction and wind speed information indicating a distribution of a wind direction and a wind speed around a pipe,
generate information concerning a gas flow around the pipe by using the wind direction and wind speed information, and
detect a gas leak or a vapor leak of the pipe by using the information concerning the gas flow,
wherein the at least one processor generates the wind direction and wind speed information based on a difference between a frequency component included in laser light irradiated to an area including the pipe and a frequency component included in first reflected light being reflected light of the laser light being caused by an aerosol particle in the area, and
wherein the at least one processor generates position and shape information indicating a position and a shape of the pipe, based on second reflected light including reflected light of the laser light being caused by the pipe.

2. The gas leak detection device according to claim 1, wherein the information concerning the gas flow includes information indicating presence or absence of occurrence of a turbulent gas flow around the pipe, and the at least one processor detects presence or absence of occurrence of the gas leak or the vapor leak by using the information concerning the gas flow.

3. The gas leak detection device according to claim 2, wherein the at least one processor executes control of outputting information indicating a result of detection by the at least one processor.

4. The gas leak detection device according to claim 2, further comprising:
a light emitting device emitting the laser light; and
a light receiving device receiving the first reflected light.

5. The gas leak detection device according to claim 1, wherein the information concerning the gas flow includes information indicating presence or absence of occurrence of a turbulent gas flow around the pipe, and information indicating an occurrence position of the turbulent gas flow, and
the at least one processor detects, by using the information concerning the gas flow and the position and shape information, presence or absence of occurrence of the gas leak or the vapor leak, and an occurrence position of the gas leak or the vapor leak in the pipe.

6. The gas leak detection device according to claim 5, wherein the at least one processor executes control of displaying an image indicating a result of detection by at least one processor,
wherein the image includes a first image being a three-dimensional image of the pipe based on the position and shape information, and a second image indicating an occurrence position of the gas leak or the vapor leak.

7. The gas leak detection device according to claim 6, wherein the second image is displayed in such a way as to be superimposed over the first image.

8. The gas leak detection device according to claim 5, wherein the at least one processor executes control of outputting information indicating a result of detection by the at least one processor.

9. The gas leak detection device according to claim 5, further comprising:

a light emitting device emitting the laser light; and a light receiving device receiving the first reflected light.

10. The gas leak detection device according to claim 1, wherein the at least one processor executes control of outputting information indicating a result of detection by the at least one processor.

11. The gas leak detection device according to claim 10, wherein the control includes control of displaying an image indicating a result of detection by the at least one processor.

12. The gas leak detection device according to claim 11, further comprising:

a light emitting device emitting the laser light; and a light receiving device receiving the first reflected light.

13. The gas leak detection device according to claim 10, further comprising:

a light emitting device emitting the laser light; and a light receiving device receiving the first reflected light.

14. The gas leak detection device according to claim 1, further comprising:

a light emitting device emitting the laser light; and a light receiving device receiving the first reflected light.

15. A gas leak detection method comprising:

generating, using at least one memory configured to store instructions; and at least one processor configured to execute the instructions, by LiDAR, wind direction and wind speed information indicating a distribution of a wind direction and a wind speed around a pipe;

generating, by the at least one processor, information concerning a gas flow around the pipe by using the wind direction and wind speed information; and detecting, by the at least one processor, a gas leak or a vapor leak of the pipe by using the information concerning the gas flow, wherein generating the wind direction and wind speed information comprises generating the wind direction and wind speed information based on a difference between a frequency component included in laser light irradiated to an area including the pipe and a frequency component included in first reflected light being reflected light of the laser light being caused by an aerosol particle in the area, and wherein the gas leak detection method further comprises generating position and shape information indicating a position and a shape of the pipe, based on second reflected light including reflected light of the laser light being caused by the pipe.

\* \* \* \* \*